(12) United States Patent
Mihály et al.

(10) Patent No.: US 8,995,985 B2
(45) Date of Patent: Mar. 31, 2015

(54) METHOD FOR USE IN ASSOCIATING TRACKING AREA LISTS WITH USER EQUIPMENTS IN A WIRELESS COMMUNICATIONS NETWORK

(75) Inventors: Attila Mihály, Dunakeszi (HU); Åke Arvidsson, Solna (SE); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 13/823,318

(22) PCT Filed: Oct. 11, 2010

(86) PCT No.: PCT/SE2010/051096
§ 371 (c)(1),
(2), (4) Date: Mar. 14, 2013

(87) PCT Pub. No.: WO2012/050492
PCT Pub. Date: Apr. 19, 2012

(65) Prior Publication Data
US 2013/0183959 A1  Jul. 18, 2013

(51) Int. Cl.
*H04W 4/00* (2009.01)
*H04W 24/00* (2009.01)
*H04W 68/02* (2009.01)
*H04W 60/00* (2009.01)
*H04W 8/02* (2009.01)

(52) U.S. Cl.
CPC ............. *H04W 68/02* (2013.01); *H04W 60/00* (2013.01); *H04W 8/02* (2013.01)
USPC ..................................... 455/422.1; 455/456.1

(58) Field of Classification Search
None
See application file for complete search history.

(56) References Cited

U.S. PATENT DOCUMENTS

| | | | |
|---|---|---|---|
| 2010/0029298 A1* | 2/2010 | Iwamura et al. | 455/456.1 |
| 2010/0227627 A1* | 9/2010 | Ishii et al. | 455/456.2 |
| 2010/0255841 A1* | 10/2010 | Kubo et al. | 455/435.1 |

FOREIGN PATENT DOCUMENTS

| | | |
|---|---|---|
| EP | 1879414 A1 | 1/2008 |
| EP | 2129141 A1 | 12/2009 |
| WO | 2008/112161 A2 | 9/2008 |
| WO | 2010/071545 A1 | 6/2010 |
| WO | 2010/091266 A1 | 8/2010 |
| WO | 2012/050492 A1 | 4/2012 |

OTHER PUBLICATIONS

International Search Report and Written Opinion for PCT/SE2010/051096 dated Jul. 6, 2011, 11 pages.
Mitsubishi Electric, "Collecting mobility statistics in support of configuration and optimisation of LTE/SAE networks," 3GPP TSG RAN WG3 Meeting #55bis, St. Julian's, Malta, Mar. 27-30, 2007, 3 pages.

* cited by examiner

*Primary Examiner* — Erika A Washington
(74) *Attorney, Agent, or Firm* — Withrow & Terranova, PLLC (57) ABSTRACT

A method for use in a core network node, such as a mobility management entity, is described for associating a tracking area list comprising at least one tracking area identity (TAIs) with a user equipment. A wireless communication network, such as an EPS network, comprises the core network node. The method comprises the steps of: registering at least one tracking area identity sequence of tracking areas repetitively used by a plurality of user equipments; and compiling at least one tracking area list using the at least one registered tracking area identity sequence. The disclosure also relates to a core network node and a computer program product.

16 Claims, 4 Drawing Sheets

| TA list | TAIs |
|---|---|
| A1 | 110, 111, 112, 113, 114 |
| A1a | a1, a2 |
| A1b | b1, b2 |

Fig. 6a

| TA list | TAIs |
|---|---|
| T1 to T2 | 112, b1 |
| T1 to T3 | 111, a1 |
| A1 from T1 | 113, 114 |

Fig. 6b

| TA list | TAIs |
|---|---|
| T1 to T2 | 112, b1 |
| T1 to T3 | 111, 112, a1 |
| A1 from T1 | 110, 111, 112, 113, 114 |

Fig. 6c

| Triggering movement pattern | Handover to TA list |
|---|---|
| TAI "M" to TAI "M±1" | A1 |
| TAI "a1" to TAI "111" | A1 |
| TAI "b1" to TAI "112" | A1 |
| TAI "111" to TAI "a1" | A1a |
| TAI "112" to TAI "b1" | A1b |
| TAI "M" to TAI "M" | TAI M |
| TAI "a1" to TAI "a1" | TAI a1 |
| TAI "b1" to TAI "b1" | TAI b1 |

Fig. 7

METHOD FOR USE IN ASSOCIATING TRACKING AREA LISTS WITH USER EQUIPMENTS IN A WIRELESS COMMUNICATIONS NETWORK

This application is a 35 U.S.C. §371 national phase filing of International Application No. PCT/SE2010/051096, filed Oct. 11, 2010, the disclosure of which is incorporated herein By reference in its entirety.

TECHNICAL FIELD

The invention relates to a method for use in associating a tracking area identity list with a user equipment in a wireless communications network. The present invention also relates to a core network node for use in associating a tracking area identity list with a user equipment in a wireless communications network and a computer program product for the same.

BACKGROUND

Registrations of current (location/routing/tracking) area are used to inform the cellular network where the mobile subscriber currently is attached. This information is used to limit the number of cells used for paging of the subscriber user equipment (UE). Without registrations all cells must be paged, the latter approach does not scale. On the other hand the registrations cause signaling load as well. This means that the network must be configured to balance between registration and paging load.

The 3$^{rd}$ Generation Partnership Project for Evolved Packet System (3GPP EPS or System Architecture Evolution/Long Term Evolution, SAE/LTE) introduces the possibility to provide the user equipment with individual information (a so-called Tracking Area (TA) list which can include multiple tracking area identities (TAIs)) on when to register to the network. The network will page the user equipment in all the Tracking Areas that are on the TA list. Thus, as long as the user equipment moves between the Tracking Areas on the TA list, it does not need to notify the network of its new location (e.g. by performing a Tracking Area Update). Note that this list of TAIs is sometimes referred to as a TA list and sometimes referred to as a TAI list. A mobility management entity (MME) can allocate a new TA list to a user equipment in conjunction with some EMM (EPS Mobility Management) procedures like Attach, Tracking Area Update (TAU) and GUTI (Globally Unique Temporary Identity) Reallocation. Note that although a GUTI Reallocation procedure normally is performed in conjunction with another mobility management procedure, e.g. as part of a TAU or Attach procedure, it can in principle be performed any time while the user equipment is in EMM-REGISTERED state (i.e. when there is an EMM context in the UE). This means that an MME may allocate a new TA list to a user equipment any time while the user equipment is in EMM-REGISTERED state.

Signaling, both for registrations (tracking area updates) and paging causes system signaling load. Therefore, to keep the system signaling load as low as possible there is a need for finding solutions to reduce the signaling load caused by tracking area updates and paging in the network. If the signaling load is reduced also cost for network nodes are reduced. In addition, this may also lead to reduced overall interference (in the context of LTE, in particular inter-cell interference) in the wireless communication system. This may improve the efficiency of the wireless communication system.

SUMMARY

An object of the present invention is to provide a method and a core network node for reducing load and interference in a wireless communication network due to tracking area update requests and/or paging.

According to an aspect of the invention, the object is achieved by a method for use in a core network node, such as a mobility management entity, for associating a tracking area list comprising at least one tracking area identity (TAIs) with a user equipment. A wireless communication network, such as an EPS network, comprises the core network node. The method comprises the steps of: registering at least one tracking area identity sequence of tracking areas repetatively used by a plurality of user equipments; and compiling at least one tracking area list using the at least one registered tracking area identity sequence.

In this way, common movement patterns of a plurality of user equipments may be determined and non-individual tracking area identity lists suitable to be associated with individual user equipments based on these overall user equipment movement patterns may be compiled. This enables the compilation of tracking area identity lists that are specifically adapted to the general movement patterns of multiple subscribers in a certain geographic region, such as, for example, along roads, highways, railways, air lifts/corridors, etc. Since these tracking area identity lists consequently will indicate one or more tracking areas in which a user equipment in that certain geographic region currently may be located by a relatively high probability, a page for a user equipment in the one or more tracking areas in its tracking area identity list will most likely result in a positive page response. If no positive page response is received for one of the tracking areas in the tracking area identity list, e.g. a first tracking area identity occuring in the tracking area identity list, another one of the tracking areas in the tracking area identity list may be paged, e.g. the next tracking area identity occuring in the tracking area identity list, etc. As a result of these tracking area identity lists, fewer tracking areas need to be paged and less tracking area update requests need to be sent, thereby yielding a reduced overall signaling load for paging and reduced interference.

Any changes in the general subscriber behaviour may in this manner also be regularly followed up and the tracking area identity lists be reconfigured in view of the changes in subscriber behaviour. This may be automatically performed by repeating the steps described above at different points in time. This may avoid unevenly distributed signalling loads in the wireless communication network, which may cause significant O&M overhead.

Furthermore, by associating one of the at least one compiled tracking area list with a individual user equipment based on an observed tracking area identity sequence of tracking areas used by the individual user equipment, specific individual user equipment movement patterns may be used to trigger the allocation of one of the at least one compiled tracking area list to a individual user equipment when the individual user equipment enters and moves in the certain geographic region for which the at least one compiled tracking area identity list has been specifically adapted.

A tracking area identity sequence of the tracking areas used by a individual or a plurality of user equipments may be registered or observed by way of existing signalling events occurring between the user equipment and the core network node as a consequence of regular operation. The existing signalling events may comprise tracking area updates (TAUs), network attach messaging, service requests, page responses, and/or handovers between radio network nodes, etc. By using these existing signalling events between the user equipment and the core network node, there is no increase in complexity or signalling in the wireless communication network when collecting information regarding the common movement patterns of a plurality of user equipments, that is, registering tracking area identity sequences of tracking areas used by a plurality of user equipments, or when observing a tracking area identity sequence of tracking areas used by a individual user equipment.

Furthermore, in case no tracking area identity sequence of tracking areas used by the individual user equipment is observed by the core network node, the individual user equipment may as a default be associated with a tracking area list consisting of the tracking area identity of the tracking area which is currently used by the individual user equipment, or a tracking area list comprising the tracking area identity of the tracking area which is currently used by the individual user equipment together with one or more tracking area identities of tracking areas adjacent to the currently used tracking area, or a tracking area list associated with the currently used tracking area.

The compiling of the at least one tracking area identity list may also comprise compiling at least two non-overlapping tracking area identity lists and/or at least two overlapping tracking area identity lists. The general idea is to compile and associate non-overlapping tracking area identity lists, that is, tracking area identity lists wherein each tracking area identity belongs to exactly one tracking area identity list. However, there may be situations where it may be beneficial to compile and associate overlapping tracking area identity lists, that is, tracking area identity lists wherein each tracking area identity may belong to more than one tracking area identity list. One example may be tracking area lists joining into a common region, such as, e.g. road arteries towards a densely populated metropolitan area. In this case, for a individual user equipment moving towards the common region, by associating a proper tracking area identity list (including the region with the starting tracking area) it may be possible to, for example, save one tracking area update (TAU) as per individual user equipment compared to the case when there would be only non-overlapping lists.

In case the tracking area identity of the tracking area currently used by a individual user equipment is comprised in at least two overlapping compiled tracking area identity lists, one of the at least two overlapping compiled tracking area identity lists may be associated with the individual user equipment based on identified mobility status information in the core network node which pertains to the particular individual user equipment.

Furthermore, in case the tracking area identity of the tracking area currently used by the individual user equipment is comprised in at least two overlapping tracking area lists and no tracking area identity sequence of tracking areas used by the individual user equipment is observed, the individual user equipment may as a default be associated with the one of the overlapping tracking area lists comprising the most frequently occuring registered tracking area identity sequence, or a randomly selected one of the overlapping tracking area lists, or the one of the overlapping tracking area lists comprising the least amount of tracking area identities, or a tracking area list comprising the overlapping tracking area identities of the overlapping tracking area lists, or a tracking area list comprising all tracking area identities of the overlapping tracking area lists, or the one of the at least two overlapping tracking area lists which is currently associated with the least number of user equipments. Implementation specific requirements may be used in determining which of these default selection alternatives of one of the overlapping tracking area lists that is to be used for a specific implementation.

By also registering adjacency information related to the tracking areas associated with the tracking area identities comprised in the at least one registered tracking area identity sequence and using the registered adjacency information when compiling the at least one tracking area identity list using the at least one registered tracking area identity sequence, ensures that the user equipment is allocated a tracking area identity list representing (geographically) contiguous tracking areas.

By further compiling, in response to detecting a significant amount of substantially simultaneous tracking area update requests from a plurality of user equipments in the same tracking area and/or cell, at least one complementary tracking area list being complementary to the at least one tracking area list previously compiled using the at least one registered tracking area identity sequence, wherein the complementary tracking area list comprises at least one of the tracking area identities of the previously compiled tracking area list, tracking area updates of different individual user equipments are enabled to be more distributed in time. In this way, for example, not all user equipments on a train may perform tracking area updates at the same time when the train turns in a new direction after leaving a metropolitan area.

The complimentary tracking area list may also comprise, for example, at least one tracking area identity of a tracking area adjacent to any one of the tracking areas indicated by the tracking area identities of the previously compiled tracking area list. Furthermore, at least one of the previously compiled tracking area list and the at least one complementary tracking area list may comprise, for example, the tracking area identity of the tracking area or cell in which the significant amount of substantially simultaneous tracking area update requests was detected.

Moreover, by associating the previously compiled tracking area list with at least one individual user equipment and at least one of the at least one complementary tracking area list with at least one other individial user equipment in response to registering substantially simultaneous tracking area updates indicating the same tracking area identity sequences from the two or more individual user equipments, tracking area updates of the individual user equipments are more distributed in time. In this way, for example, not all user equipments on a train will perform tracking area updates at the same time when the train turns in a new direction after leaving a metropolitan area. The association of the previously compiled tracking area list and/or at least one of the at least one complementary tracking area list with the individual user equipments may be performed based on calculated probabilities or at random.

According to another aspect of the invention, the object is achieved by a core network node for associating a tracking area list comprising at least one tracking area identity (TAIs) with a user equipment, wherein a wireless communication network comprises the core network node. The core network node comprising a processing unit being configured to register at least one tracking area identity sequence of tracking areas repetatively used by a plurality of user equipments; and compile at least one tracking area list using the at least one registered tracking area identity sequence.

According to a further aspect of the invention, the object is achieved by a computer program product for use in a core network node in wireless communications network for associating a tracking area list comprising at least one tracking area identity (TAIs) with a user equipment. The computer program product comprising computer readable code means, which when run in a processing unit in the core network node causes the core network node to perform the steps of: registering at least one tracking area identity sequence of tracking areas repetatively used by a plurality of user equipments; and compiling at least one tracking area list using the at least one registered tracking area identity sequence.

Another advantage of the invention is that the embodiments of the invention may be implemented in an existing wireless communication system, such as an EPS network, without changes to the signaling procedures between the user equipment and the core network node, such as an MME, for tracking area update procedures and paging procedures.

Further features of, and advantages with, the invention will become apparent when studying the following description. Those skilled in the art realize that different features of the present invention may be combined to create embodiments other than those described in the following.

BRIEF DESCRIPTION OF THE DRAWINGS

The objects, advantages and effects as well as features of the invention will be more readily understood from the following detailed description of exemplary embodiments of the invention when read together with the accompanying drawings, in which.

ABBREVIATIONS

EMM EPS Mobility Management
ECGI E-UTRAN Cell Global Identity
eNB eNodeB
EPS Evolved Packet System
E-UTRAN Evolved Universal Terrestrial Radio Access Network
GUTI Globally Unique Temporary Identity
IE Information Element
LTE Long Term Evolution
MME Mobility Management Entity
NAS Non Access Stratum
OSS Operation and Support System
O&M Operation and Management
S1AP S1 Application Protocol (The control plane protocol used between an eNB and an MME.)
SAE System Architecture Evolution
TA Tracking Area
TAI Tracking Area Identity
TAU Tracking Area Update
UE User Equipment
Description Throughout the following description similar reference numerals have been used to denote similar elements, parts, items or features, when applicable. It may be noted that the expression "user equipment" (UE) includes, but is not limited to, a mobile terminal, a mobile phone, a personal digital assistant, a mobile station, a portable computer equipped with suitable transceivers, a stationary computer equipped with suitable transceivers and the like.

Figure 1:
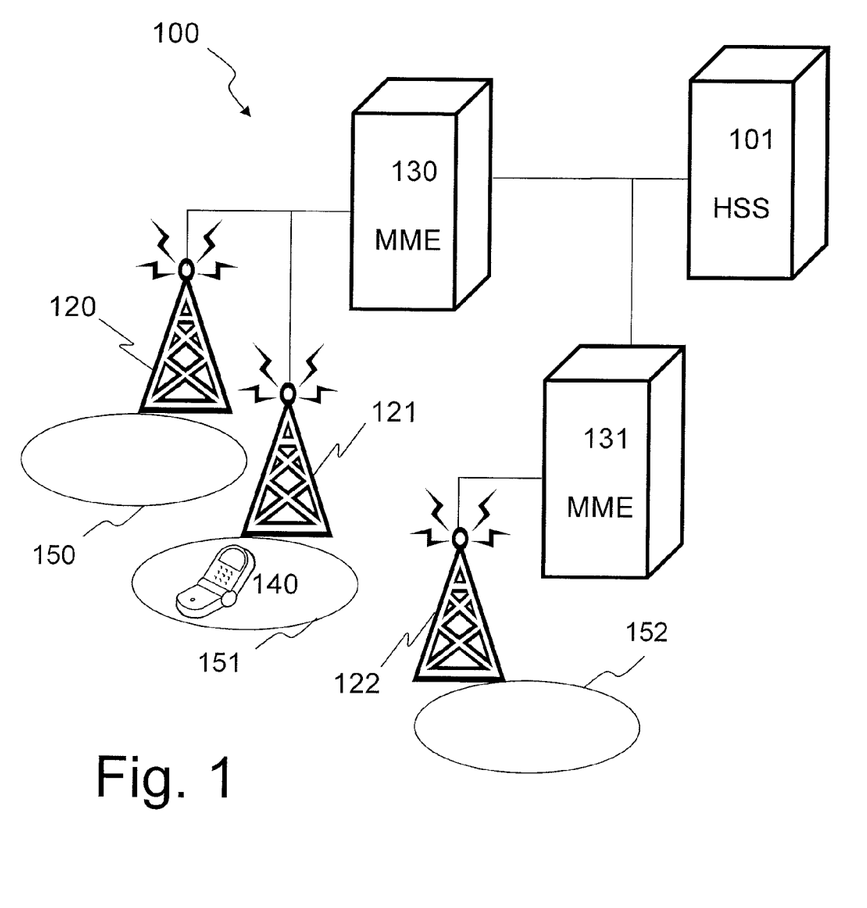
FIG. 1 shows a schematic, exemplifying system in which the invention may be implemented.

FIG. 1 shows a schematic overview of a wireless communication network 100. The wireless communication network 100 may comprise a Home Subscriber Server (HSS) 101, a Mobility Management Entity (MME) 130, 131, a radio network node 120, 121, 122 and a user equipment (UE) 140. The radio network node 120, 121, 122, which may be a radio base station network node, such as, an eNB, is served by the MME 130, 131. Each radio network node 120, 121, 122 is associated with at least one cell 110, 111, 112. Furthermore, a tracking area identifier (also referred to as tracking area identity or TAI) is associated with at least one cell 150, 151, 152. The HSS 101 and the MME 130, 131 may also be referred to as core network nodes 101, 130, 131. Hence, in the following, when referring to a core network node, the expression "core network node" is to be understood as meaning any one of the HSS 101 and the MME 130, 131. However, the expression "core network node" is to be understood to also extend to cover other central network entity nodes, such as, Operation and Management nodes (O&M), Operation and Support System nodes (OSS), or shared database nodes (may be used for synchronisation of common data in MME pools).

An idea of the invention is that, when traveling within a certain geographical region, subscribers having UEs, such as, for example, UE 140, often use a common infrastructure and will therefore exhibit common movement patterns also within the wireless communication network. By monitoring these common movement patterns, a finite set of tracking area identity (TAI) lists describing these typical movement patterns may be defined. These may then be associated with individual UEs based on observed indications of each individual UEs mobility pattern, such as, an observed tracking area identity sequence.

Movements made by a UE in relation to TAs may be detected and tracked through signalling events which occur anyway as consequence of regular operation of the wireless communication network. These signallling events may comprise, for example, tracking area updates (TAUs), network attach messages, service request messages and inter-eNB handover messages, etc. For example, during a TAU, a network attach or a service request procedure of the UE, the NAS messages TAU Request, Attach Request and Service Request, respectively, are transferred from the UE to the core network node. Between the radio network node (for example, an eNB) and the core network node (for example, an MME), these messages may be carried by either of the S1AP messages INITIAL UE MESSAGE or UPLINK NAS TRANSPORT. Both the S1AP messages INITIAL UE MESSAGE or UPLINK NAS TRANSPORT may comprise the TAI, as well as, the ECGI of the UEs current cell. In addition, the TAU Request and the Attach Request messages may optionally comprise the TAI of the previous tracking area in the Last visited registered TAI IE. During an inter-eNB handover procedure the core network node receives the TAI of the UE's current cell (that is, the target cell of the handover) in the S1AP message PATH SWITCH REQUEST. Furthermore, from the S1 interface used during the signalling procedures, the core network node may infer the UEs current radio network node. Hence, all these regular signalling events allows a core network node to determine and track the location of a user equipment (and hence the UEs coarse movements) with an accuracy provided by tracking areas, cells or radio network nodes (for example, eNBs).

Figures 2, 3:
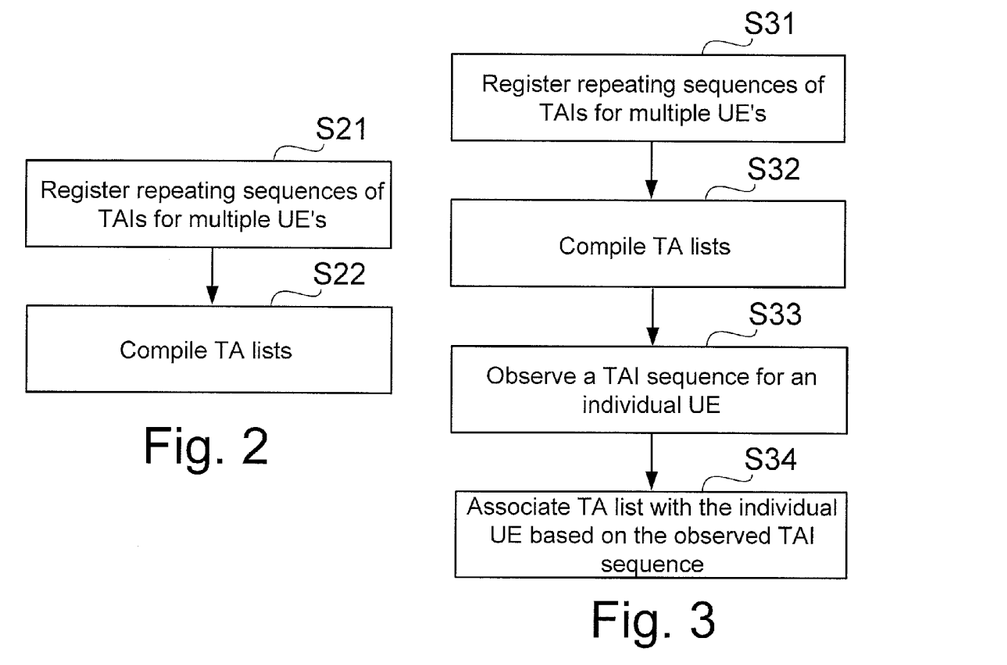
FIG. 2 shows a schematic flow chart of a method according to an embodiment of the invention.
FIG. 3 shows a schematic flow chart of a method according to a further embodiment of the invention.

FIG. 2 shows a schematic flow chart of an embodiment of the method for use in a core network node 130, 131, 101 according to the invention.

In step S21, the core network node 130, 131, 101 may register TAI sequences of TAs repetatively used by a plurality of UEs. The core network node 130, 131, 101 may find repeating patterns of TAIs through the above described signalling events of different UEs. The core network node 130, 131, 101 may also register adjacency information of the TAs when registering the repeating patterns of TAIs. This adjacency information describing to the core network node 130, 131, 101 which TAs that are adjacent to a particular TA may be inferred from the above described signalling events. An example is the inter-eNB handover procedure through which information ensuring that no TA has been crossed undetected since the UEs last signalling event may be provided. Alternatively, adjacency information of TAs may also be manually configured in the core network node 130, 131, 101.

In step S22, the core network node 130, 131, 101 may compile at least one TAI list using the registered TAI sequences of TAs repetatively used by a plurality of UEs. The core network node 130, 131, 101 may, for example, order the repeating patterns of TAIs in non-overlapping and/or overlapping groups, and create a TAI list for each of the top-N most frequently repeated patterns. N may here be any suitable number of TAI lists for a certain geographical region. Optionally, the TAI lists may also be ordered in accordance with the frequency of the registered mobility patterns. This may be advantageous since this information may be used later on when subsequently associating said TAI lists with individual UEs. Also note that a set of TAI lists created in the above described way may also be manually complemented or modified by O&M with further TM lists covering TAIs of different key areas, such as, for example, specific important road segments or railways etc. Illustrative examples of compiled TAI lists according to the invention are shown and described below with reference to FIGS. 5-6.

In case the steps S21-S22 is performed by a core network node, such as, an MME, different MMEs participating in a MME pool may register somewhat different information and repeating patterns of TAIs. Therefore, in order to improve the available statistics, an alternative may be to aggregate the registered information from the different MMEs in the MME pool in a central entity, e.g. the HSS, the OSS or in a shared database.

It should also be noted that a core network node may automatically repeat the steps S21-S22 at regular intervals in order to provide updated and accurate TAI lists, and thus avoid unevenly distributed signalling loads in the wireless communication network 100, which may cause significant O&M overhead. The steps S21-S22 may also be repeated in response to detecting a change in the general subscriber behaviour and movement patterns.

FIG. 3 shows a schematic flow chart of a further embodiment of the method for use in a core network node 130, 131, 101 according to the invention. The steps S31-S32 are identical to the steps S21-S22 according to the previous embodiment of the method described above with reference to FIG. 2.

In step S33, the core network node 130, 131, 101 may observe a TAI sequence for an individual UE. It may be noted that the expression "observed tracking area identity sequence" is to be understood herein to refer to a TAI sequence registered in a core network node for an individual user equipment. For the sake of clarity, this expression is used in order to differentiate a registered TAI sequence registered in a core network node for a individual user equipment from a registered TAI sequence of a user equipment for the purpose described in step S21. The core network node 130, 131, 101 may monitor the mobility status of each individual UE by observing the signalling events of each individual UE in the wireless communications network. As decribed above, these signallling events may comprise e.g. tracking area updates (TAUs), network attach messages, service request messages and inter-eNB handover messages, etc. Thus, for example, as an individual UE moves from one TA to another TA, the core network node 130, 131, 101 may thus register a TAI sequence for the individual UE, which may comprise the TAI of the previous TA and the TAI of the TA in which the individual UE is currently located.

In step S34, the core network node 130, 131, 101 may associate one of the TAI lists registered and compiled in the steps S31-S32 with the individual UE based on the observed TAI sequence for the individual UE in step S33. The observed TAI sequence for the individual UE is the triggering movement pattern which determines which of the registered and compiled TAI lists should be associated with the individual UE. Associating a TAI list with an individual UE may herein also comprise sending the TAI list to the individual UE in order to, for example, replace an earlier associated TAI list in the individual UE. An illustrative example of triggering movement patterns and their associated TAI lists according to the invention are shown and described below with reference to FIG. 7.

However, in case no TAI sequence of TAs used by the individual UE is observed in step S33, the core network node 130, 131, 101 may as a default associate, with the individual UE, a TAI list consisting of the TM of the TA which is currently used by the individual UE. This may, for example, be performed in case the Last visited registered TAI IE is available during NAS signalling and the individual UE is currently located within that TM. Alternatively, the core network node 130, 131, 101 may associate, with the individual UE, a TAI list comprising the TAI of the TA which is currently used by the individual UE together with one or more TAIs of TAs adjacent to the currently used TA. According to another alternative, the core network node 130, 131, 101 may associate, with the individual UE, a TAI list that is already associated with the currently used TA. This may, for example, be advantageous in case the UE is expected to remain within the currently used TA (for example, if consecutive TAUs are registered for the same TA).

Figure 4:
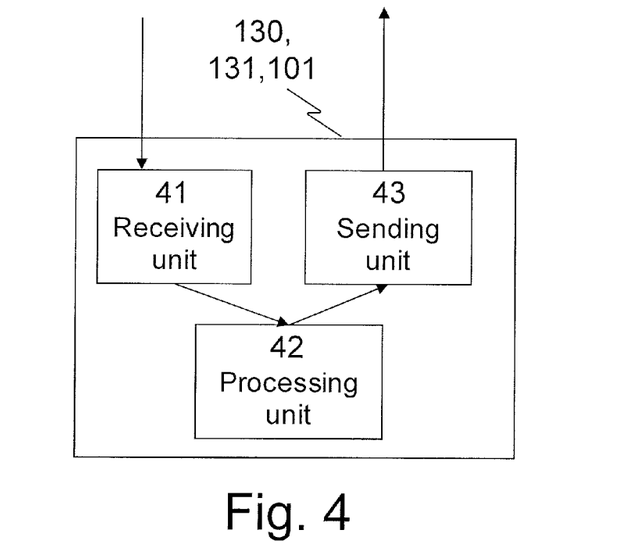
FIG. 4 shows a schematic block diagram of an embodiment of a core network node according to the invention.

FIG. 4 shows a schematic block diagram of an embodiment of the core network node 130, 131, 101 for associating a TAI list with a UE. The core network node 130, 131, 101 comprises a processing unit 42 that is configured to register TAI sequences of TAs repetatively used by a plurality of UEs, and compile at least one tracking area list using the registered TAI sequences. In a further embodiment, the processing unit 42 in the core network node 130, 131, 101 may be configured to observe a TM sequence for an individual UE, and associate one of the compiled TAI lists with the individual UE based on the observed TAI sequence. Optionally, the core network node 130, 131, 101 may also comprise a receiving unit 41 and a sending unit 43.

Furthermore, the processing unit 42 may be connected to the receiving unit 41 and the sending unit 43. The processing unit 42 may be arranged to detect any one of the signalling events comprising, for example, tracking area updates (TAUs), network attach messages, service request messages and inter-eNB handover messages, etc., and receive/retrieve any one of these messages or information comprised therein. The processing unit 42 may also be configured to send information regarding, for example, registered TM sequences, compiled TAI lists, etc., to other core network nodes.

It should be noted that the processing unit 42 may comprise logic for performing the functionality of the core network node 130, 131, 101. This functionality may be implemented by means of a software or computer program. The processing unit 42 may also comprise storage means or a memory unit for storing the computer program and processing means, such as e.g. a microprocessor, for executing the computer program. The storage means may also be readable storage medium separated from, but connected to the processing unit 42. When it is described herein that the core network node 130, 131, 101 performs a certain action or function it is to be understood that the processing unit 42 in the core network node 130, 131, 101 may use its processing means to execute a certain part of the software or computer program which is stored in its storage means in order to perform said action or function. The processing unit 42 in the core network node 130, 131, 101 may be configured to perform the steps according to the embodiments of the method as described with reference to FIGS. 2-3.

Figure 5:
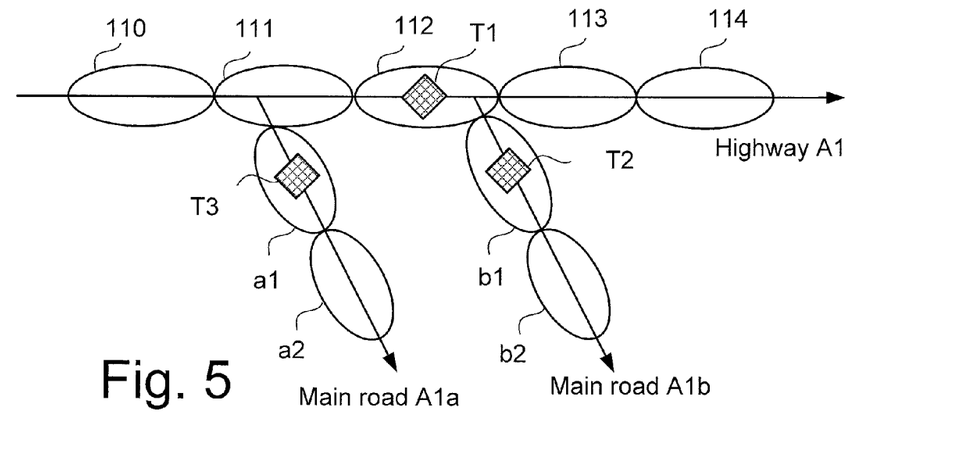
FIG. 5 shows an exemplary tracking area topology covering a geographic region comprising three towns, a highway and two main roads.

FIG. 5 shows an exemplary tracking area topology covering a geographic region comprising three towns T1, T2, T3, a highway A1 and two main roads A1a, A1b. The highway A1 is covered by the tracking areas {110, 111, 112, 113, 114}, the main road A1a is covered by the tracking areas {a1, a2}, and the main road A1b is covered by the tracking areas {b1, b2}. Here, for illustrative purposes, the tracking areas identities (TAIs) of the tracking areas (TAs) are assumed to have identical notation, i.e. TA 110 has TAI=110. The town T1 is located in TA with the TAI {112}, the town T2 is located in the TA with the TAI {b1}, and the town T3 is located in the TA with the TAI {a1}. FIG. 2 also shows traffic junctions connecting the highway A1 with the main roads A1a and A1b.

Figure 6A:
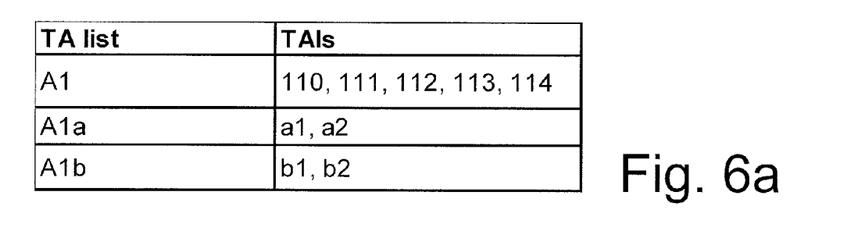
FIG. 6a-6c shows tables describing exemplary tracking area identity lists, associated with the exemplary tracking area topology in FIG. 5, according to the invention.

FIG. 6a shows a table describing exemplary tracking area identity lists associated with the exemplary tracking area topology in FIG. 5. The tracking area identity lists in the table is an exemplary result of the embodiments of the method and core network node according to the invention described above with reference to FIG. 2-4. The table comprises the top-3 most frequently observed non-overlapping UE mobility patterns, i.e. registered non-overlapping TAI sequences, registered by a core network node.

In this example, it is assumed that the traffic targeting the towns T1-T3 in FIG. 5 is not significantly large compared to the overall traffic along highway A1 and the main roads A1a, A1b. Thus, the resulting TAI lists according to the invention and representing the top-3 most frequently observed non-overlapping UE mobility patterns may comprise the TAIs of the TAs along highway A1 and the main roads A1a, A1b. For example, the core network node may compile a TAI list dedicated to the highway A1 comprising TAIs {110, 111, 112, 113, 114}, a TAI list dedicated to the main road A1a comprising the TAIs {a1, a2}, and a TAI list dedicated to the main road A1b comprising the TAIs {b1, b2}.

Figure 6B:
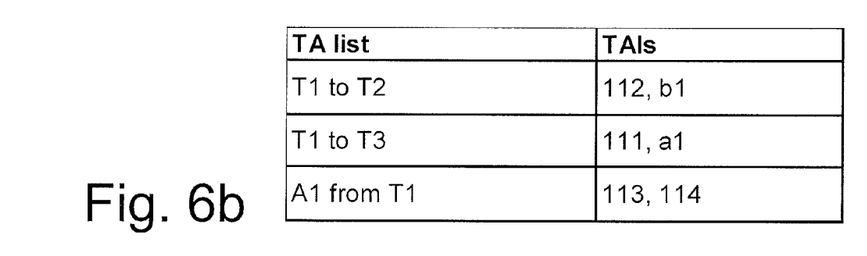

FIG. 6b shows another table describing exemplary tracking area identity lists associated with the exemplary tracking area topology in FIG. 5. The tracking area identity lists in the table is also an exemplary result of the embodiments of the method and core network node according to the invention described above with reference to FIG. 2-4. The table comprises the top-3 most frequently observed non-overlapping UE mobility patterns registered by a core network node.

In this example, it is assumed that the populations of the towns T1-T3 in FIG. 5 are significantly large and therefore resulting in a significant amount of traffic between the towns T1-T3 as compared to the overall traffic along highway A1 and the main roads A1a, A1b. Thus, the resulting TAI lists according to the invention and representing the top-3 most frequently observed non-overlapping UE mobility patterns may comprise the TAIs of the TAs between the towns T1-T3. For example, the core network node may compile a TAI list representing the traffic between town T1 and town T2 comprising TAIs {112, b1}, a TAI list representing the traffic between town T1 and town T3 comprising the TAIs {111, a1}, and a TAI list representing the traffic from town T1 to highway A1 comprising the TAIs {113, 114}.

Figure 6C:
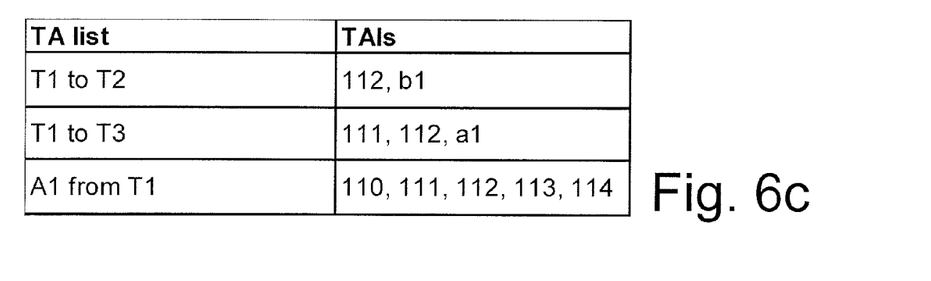

FIG. 6c shows a further table describing exemplary tracking area identity lists associated with the exemplary tracking area topology in FIG. 5. The tracking area identity lists in the table is also an exemplary result of the embodiments of the method and core network node according to the invention described above with reference to FIG. 2-4. The table comprises the top-3 most frequently observed overlapping UE mobility patterns registered by a core network node.

As in the example described with reference to FIG. 6b, it is here also assumed that the populations of the towns T1-T3 in FIG. 5 are significantly large and therefore resulting in a significant amount of traffic between the towns T1-T3 as compared to the overall traffic along highway A1 and the main roads A1a, A1b. Similarly, the resulting TM lists according to the invention and representing the top-3 most frequently observed overlapping UE mobility patterns, i.e. registered overlapping TAI sequences, may also comprise the TAIs of the TAs between the towns T1-T3. However, the core network node may here, for example, compile a TAI list representing the traffic between town T1 and town T2 comprising TAIs {112, b1}, a TAI list representing the traffic between town T1 and town T3 comprising the TAIs {111, 112, a1}, and a TAI list representing the traffic from town T1 to highway A1 comprising the TAIs {110, 111, 112, 113, 114}. It should be noted that if, for example, there is also a significant amount of traffic between the towns T2 and T3, the core network node may, for example, compile a TAI list representing the traffic between the towns T2 and T3 comprising TAIs {b1, 112, 111, a1} instead of one of the previously mentioned TAI lists (or, if N=4, in addition to the previously mentioned TM lists).

Figure 7:
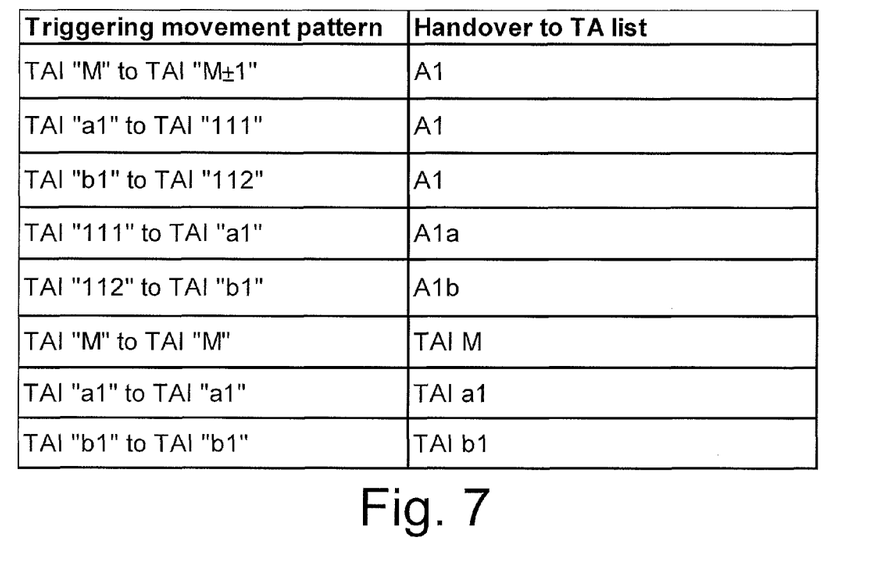
FIG. 7 shows a table describing exemplary triggering movement patterns, associated with the exemplary tracking area topology in FIG. 5 and the exemplary tracking area identity lists of the table in FIG. 6a, according to an embodiment of the invention.

FIG. 7 shows a table describing exemplary triggering movement patterns associated with the exemplary tracking area topology in FIG. 5 and the exemplary tracking area identity lists of the table in FIG. 6a. Triggering movement patterns in the table is also an exemplary result of the embodiments of the method and core network node according to the invention described above with reference to FIG. 2-4. If a triggering movement pattern (that is, an observed TAI sequence) is detected by the core network node 130, 131, 101 for an individual UE, the core network node 130, 131, 101 may select one of the previous compiled TAI lists, for example, the TAI lists in table in FIG. 6a, and associate said previous compiled TAI list with the individual UE based on said triggering movement pattern. The triggering movement pattern may be based on detected signalling events from an individual UE moving from one TA to another TA.

For example, in FIG. 7, if a core network node 130, 131, 101 detects that an individual UE has moved from a TA with TAI {M} to another TA with TAI {MA} in the TA topology in FIG. 5, that is, a UE moving along highway A1, the core network node 130, 131, 101 may be configured to associate the TAI list {A1} from the TAI lists of the table in FIG. 6a with the individual UE. M may here be an integer representing any one of the TAs along highway A1. In a similar manner, if a core network node 130, 131, 101 detects that an individual UE has turned out on the highway A1 from one of the main roads A1a or A1b in FIG. 5 (that is, from TA with TAI {a1} to the TA with TAI {111} or from TA with TAI {b1} to the TA with TAI {112}), the core network node 130, 131, 101 may be configured to associate the TAI list {A1} from the TAI lists of the table in FIG. 6a with the individual UE. Also, if a core network node 130, 131, 101 detects that an individual UE has turned from highway A1 onto one of the main roads A1a or A1b in FIG. 5 (that is, from TA with TAI {111} to the TA with TAI {a1} or from TA with TAI { 112 } to the TA with TAI {b1}), the core network node 130, 131, 101 may be configured to associate the TAI list {A1a} or {A1b}, respectively, from the TAI lists of the table in FIG. 6a with the individual UE.

As shown in FIG. 7, in case a core network node 130, 131, 101 detects multiple subsequent signalling events from an individual UE in the same TA for a predetermined period of time, such as, e.g. one or more periodic TAUs, the core network node 130, 131, 101 may be configured to associated a TM list comprising only the TAI of the TA in which the individual UE is currently located.

It should also be noted that in the case of having at least two overlapping TM lists, as shown in the table in FIG. 6c, another way of associating a TAI list to an individual UE may be implemented in the core network node 130, 131, 101. This is because a change from one TA to another TA may not unambiguously determine which TM list the individual UE should be associated with (that is, when having non-overlapping TAI-lists). One option is to establish or identify mobility status information of an individual UE using the Last visited registered TAI IE to determine from which TA the individual UE entered the common region of TAs in order to have an observed TAI sequence from which to determine which TAI list the individual UE should be associated with. Thus, when an individual UE is moving in the common region of TAs of at least two overlapping TM lists, the core network node 130, 131, 101 may also utilize this identified mobility status information on the individual UE in order to break the tie and determined which TAI list of the at least two overlapping TAI lists is to be associated with the individual UE. One alternative is to establish or identify mobility status information by determining a movement direction of the individual UE based on performed consecutive handovers of the individual UE. Another alternative to identify mobility status information is, in case the individual UE is idle, that is, when the individual UE is not in EMM-CONNECTED state, to use consecutive location samples without handover in between to determine a direction of movement of the individual UE. In case any one or several of these alternatives of establishing or identifying mobility status information pertaining to the individual UE is available to the core network node 130, 131, 101 when a triggering movement pattern has been detected and the individual UE is moving in the common region of TAs of at least two overlapping TM lists, the core network node 130, 131, 101 may use this identified mobility status information in order to determine which of the TM lists should be associated with the individual UE.

However, if no TAI sequence of TAs of the individual UE has been observed by the core network node 130, 131, 101 and the individual UE is moving in the common region of TAs having TMs comprised in at least two overlapping TAI lists, the core network node 130, 131, 101 may also, for example, select the TAI list which corresponds to the registered mobility pattern that has the highest frequency and associate this TAI list with the individual UE. Alternatively, the core network node 130, 131, 101 may compile a new TAI list comprising the common region of TAs. This may be advantageous in case a low mobility of the individual UE can be assumed. According to another alternative, the core network node 130, 131, 101 may compile a new TAI list by merging the at least two overlapping TAI lists. This may be advantageous in case the importance of TAU signalling outweights that of paging. According to a further alternative, the core network node 130, 131, 101 may select one of the TAI lists at random, which has the advantage of reducing the impact of TAU peaks. According to yet a further alternative, the core network node 130, 131, 101 may disregard the TAI lists and allocate a TAI list as in the case described above when no TAI sequence of TAs used by the individual UE could be observed. According to yet a further alternative, the core network node 130, 131, 101 may select the TAI list comprising the least number of TAIs.

In a further embodiment of the invention, in order to handle TAU peaks that may be generated by a large number of UEs sending TAUs at the same time, the core network node 130, 131, 101 may be further configured to detect a significant amount of substantially simultaneous TAU requests from a plurality of UEs in the same TA and/or cell. This may, for example, indicate that several UEs are moving in groups together on busses or trains. In response to the detection of a significant amount of substantially simultaneous TAU requests from a plurality of UEs in the same TA and/or cell, the core network node 130, 131, 101 may further be configured to compile at least one complementary TAI list to a previously compiled TAI list, wherein the complementary TAI list may comprise, for example, all of the TAIs of the previously compiled TAI list and at least one TAI of a TA adjacent to any one of the TAs indicated by the TAIs of the previously compiled TAI list. Alternatively, the complementary TAI list may comprise at least one of the TAIs of the previously compiled TM list. According to other examples, the core network node 130, 131, 101 may, for example, copy the previously compiled TAI list and delete one TAI from the previously compiled TAI list to compile a complementary TAI list and/or add an adjacent a TAI of a TA adjacent to any one of the TAs indicated by the TAIs of the previously compiled TM list. Also, at least one of the previously compiled TM list and the at least one complementary TAI list may comprise, for example, the TAI of the TA or cell in which the significant amount of substantially simultaneous TAU requests was detected.

Furthermore, the core network node 130, 131, 101 may be configured to associate the previously compiled TAI list with at least one of the UEs and at least one of the at least one complementary TAI list with another one of the UEs. This may be performed by the core network node 130, 131, 101 in response to registering substantially simultaneous TAUs indicating the same TAI sequences from the UEs. For example, in case a TAI list comprising the TAIs {110, 112, 113, 114, 115} is to be associated with a plurality of UEs moving in the tracking area topology in FIG. 5, the core network node 130, 131, 101 may compile and associate a suitable number of new TAI lists comprising the TAIs { 110, 112, 113, 114, 115, a1}, {110, 112, 113, 114, 115, b1} and {110, 112, 113, 114, 115, a1, b1} in order to distribute the TAUs from the plurality of UEs. In this way not all UEs moving together, e.g. on a buss or train, will send a TAU at the same time when the buss or train turns from moving along highway A1 and along one of the main roads A1a or A1b. The previously compiled TAI list and its complementary TAI lists may be associated with the plurality of UEs in different proportions based on probabilities or at random.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:
1. A method for use in a core network node for associating a tracking area list comprising at least one tracking area identity TAIs with a user equipment, wherein a wireless com- munication network comprises the core network node, the method comprising the steps of:
  registering at least one tracking area identity sequence of tracking areas repetitively used by a plurality of user equipments;
  compiling at least one tracking area list using the at least one registered tracking area identity sequence; and
  associating one of the at least one compiled tracking area list with a individual user equipment based on an observed tracking area identity sequence of tracking areas used by the individual user equipment.

2. Method according to claim 1, wherein the tracking area identity sequences of the tracking areas used by a individual or a plurality of user equipment(s) is registered or observed by way of existing signalling events occurring between the user equipment and the core network node as a consequence of regular operation, such as, tracking area updates TAUs, network attach messaging, service requests, page responses, and/or handovers between radio network nodes.

3. Method according to claim 1, further comprising the step of:
  associating, in case no tracking area identity sequence of tracking areas used by the individual user equipment is observed, with the individual user equipment
    a tracking area list consisting of the tracking area identity of the tracking area which is currently used by the individual user equipment; or
    a tracking area list comprising the tracking area identity of the tracking area which is currently used by the individual user equipment together with one or more tracking area identities of tracking areas adjacent to the currently used tracking area; or
    a tracking area list associated with the currently used tracking area.

4. Method according to claim 1, wherein the step of compiling at least one tracking area list comprises:
  compiling at least two non-overlapping tracking area identity lists and/or at least two overlapping tracking area identity lists.

5. Method according to claim 4, further comprising the step of:
  associating, in case the tracking area identity of the tracking area currently used by the individual user equipment is comprised in at least two overlapping compiled tracking area identity lists, one of the at least two overlapping compiled tracking area identity lists with a individual user equipment based on identified mobility status information in the core network node pertaining to the individual user equipment.

6. Method according to claim 4, further comprising the step of:
  associating, in case the tracking area identity of the tracking area currently used by the individual user equipment is comprised in at least two overlapping compiled tracking area identity lists and no tracking area identity sequence of tracking areas used by the individual user equipment is observed, with the individual user equipment
    the one of the overlapping tracking area lists comprising the most frequently occurring registered tracking area identity sequence; or
    a randomly selected one of the overlapping tracking area lists; or
    the one of the overlapping tracking area lists comprising the least amount of tracking area identities; or
    a tracking area list comprising the overlapping tracking area identities of the overlapping tracking area lists; or
    a tracking area list comprising all tracking area identities of the overlapping tracking area lists, or
    the one of the at least two overlapping tracking area lists which is currently associated with the least number of user equipments.

7. Method according to claim 1, wherein the step of compiling at least one tracking area list using the at least one registered tracking area identity sequence further comprises:
  registering adjacency information related to the tracking areas associated with the tracking area identities comprised in the at least one registered tracking area identity sequence; and
  using the registered adjacency information when compiling at least one tracking area list using the at least one registered tracking area identity sequence.

8. Method according to claim 1, wherein the step of compiling at least one tracking area list using the at least one registered tracking area identity sequence further comprises
  compiling, in response to detecting a significant amount of substantially simultaneous tracking area update requests from a plurality of user equipments in the same tracking area and/or cell, at least one complementary tracking area list being complementary to the at least one tracking area list previously compiled using the at least one registered tracking area identity sequence, wherein the complementary tracking area list comprises at least one of the tracking area identities of the previously compiled tracking area list.

9. Method according to claim 8, wherein the complimentary tracking area list further comprises at least one tracking area identity of a tracking area adjacent to any one of the tracking areas indicated by the tracking area identities of the previously compiled tracking area list.

10. Method according to claim 8, wherein at least one of the previously compiled tracking area list and the at least one complementary tracking area list comprises the tracking area identity of the tracking area or cell in which the significant amount of substantially simultaneous tracking area update requests was detected.

11. Method according to claim 8, further comprising the step of:
  associating the previously compiled tracking area list with at least one individual user equipment and at least one of the at least one complementary tracking area list with at least one other individual user equipment in response to registering substantially simultaneous tracking area updates indicating the same tracking area identity sequences from the at least one individual user equipments.

12. Method according to claim 11, wherein the association of the previously compiled tracking area list and/or at least one of the at least one complementary tracking area list with the individual user equipments is performed based on calculated probabilities or at random.

13. A core network node for associating a tracking area list comprising at least one tracking area identity TAIs with a user equipment, wherein a wireless communication network comprises the core network node, the core network node comprising a processing unit being configured to
  register at least one tracking area identity sequence of tracking areas repetitively used by a plurality of user equipments;
  compile at least one tracking area list using the at least one registered tracking area identity sequence; and observe a TAI sequence for an individual user equipment, and associate one of the compiled TAI lists with the individual user equipment based on the observed TAI sequence.

14. A non-transitory computer program product for use in a core network node in wireless communications network for associating a tracking area list comprising at least one tracking area identity TAIs with a user equipment, which comprises computer readable code means, which when run in a processing unit in the core network node causes the core network node to perform the steps of:

registering at least one tracking area identity sequence of tracking areas repetitively used by a plurality of user equipments;

compiling at least one tracking area list using the at least one registered tracking area identity sequence; and associating one of the at least one compiled tracking area list with a individual user equipment based on an observed tracking area identity sequence of tracking areas used by the individual user equipment.

15. The non-transitory computer program product according to claim 14, wherein the at least one tracking area identity sequence of the tracking areas used by the plurality of user equipment(s) is registered or observed by way of existing signaling events occurring between the user equipment and the core network node as a consequence of regular operation, such as, tracking area updates TAUs, network attach messaging, service requests, page responses, and/or handovers between radio network nodes.

16. The non-transitory computer program product according to claim 14, wherein said computer readable code means is stored on a readable storage medium.

\* \* \* \* \*